(12) United States Patent
Miyasaka

(10) Patent No.: US 8,769,215 B2
(45) Date of Patent: Jul. 1, 2014

(54) RECORDING DEVICE, RECORDING DEVICE CONTROL METHOD, AND STORAGE MEDIUM

(75) Inventor: Masayo Miyasaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 13/433,760

(22) Filed: Mar. 29, 2012

(65) Prior Publication Data

US 2012/0265945 A1    Oct. 18, 2012

(30) Foreign Application Priority Data

Apr. 15, 2011    (JP) ................................. 2011-091081

(51) Int. Cl.
   *G06F 12/00*    (2006.01)
(52) U.S. Cl.
   USPC .......................................................... 711/154
(58) Field of Classification Search
   None
   See application file for complete search history.

(56) References Cited

U.S. PATENT DOCUMENTS

| | | | |
|---|---|---|---|
| 5,594,653 A | 1/1997 | Akiyama et al. | |
| 5,842,038 A * | 11/1998 | Williams et al. | 710/5 |
| 6,198,985 B1 | 3/2001 | Miyasaka et al. | |
| 6,205,363 B1 | 3/2001 | Miyasaka et al. | |
| 6,208,906 B1 | 3/2001 | Miyasaka et al. | |
| 6,360,135 B1 | 3/2002 | Miyasaka et al. | |
| 6,362,896 B1 | 3/2002 | Miyasaka et al. | |
| 6,434,445 B2 | 8/2002 | Miyasaka et al. | |
| 6,453,208 B2 | 9/2002 | Miyasaka et al. | |
| 6,697,678 B2 | 2/2004 | Miyasaka et al. | |
| 6,925,539 B2 * | 8/2005 | Mowery et al. | 711/158 |
| 6,975,423 B2 | 12/2005 | Koakutsu et al. | |
| 2003/0149838 A1 * | 8/2003 | Mowery et al. | 711/113 |
| 2011/0119415 A1 | 5/2011 | Miyasaka | |
| 2011/0252205 A1 * | 10/2011 | Rege | 711/154 |
| 2012/0099145 A1 | 4/2012 | Miyasaka et al. | |

FOREIGN PATENT DOCUMENTS

| | | |
|---|---|---|
| JP | 2001-260435 A | 9/2001 |
| JP | 2004-005758 A | 1/2004 |
| JP | 2008-120094 A | 5/2008 |
| JP | 2011-104861 A | 6/2011 |

* cited by examiner

*Primary Examiner* — Brian Peugh

(57) ABSTRACT

Managing commands in a buffer is simplified while continuing to enable immediately executing real-time commands. A control unit of a printer sequentially writes commands received from a host computer to a first buffer and sequentially reads the commands. If the read command is a real-time command, the control unit executes the command. If the read command is a normal command, the control unit writes the command to a second buffer without executing the command from the first buffer. The control unit sequentially reads and executes normal commands written to the second buffer.

12 Claims, 5 Drawing Sheets ting # RECORDING DEVICE, RECORDING DEVICE CONTROL METHOD, AND STORAGE MEDIUM

CROSS-REFERENCE TO RELATED APPLICATION(S)

This application claims priority under 35 U.S.C. §119 on Japanese application 2011-091081, filed on Apr. 15, 2011, the contents of which are incorporated by reference herein.

BACKGROUND

1. Technical Field

The present invention relates to a recording device capable of connecting to a control device, a recording device control method, and a storage medium for storing a program for implementing the method.

2. Related Art

Recording devices (image forming devices) that operate according to commands received from a control device (host computer) are known from the literature. See, for example, Japanese Unexamined Patent Appl. Pub. JP-A-2001-260435. Such recording devices temporarily write commands received from the control device to a buffer (memory), and sequentially execute the commands written in the buffer.

In addition to normal commands for recording images, for example, the commands that such recording devices receive from the control device also include real-time commands requiring immediate execution. Examples of such commands include commands requesting the return of recording device status information, and reset commands.

The recording device must manage the real-time commands and normal commands stored in the buffer so that the real-time commands are executed immediately and the unexecuted normal commands are executed in the order received. This makes the process of managing the buffered commands complicated and time-consuming.

SUMMARY

The present invention simplifies managing commands in a buffer for faster processing while also ensuring that real-time commands are executed immediately.

One aspect of the invention is embodied in a recording device capable of connecting to a control device. The recording device includes: a first memory area; a second memory area that is different from the first memory area; and a control unit that controls the first and second memory areas. In doing so, the control unit writes a command, when received from the control device, to the first memory area, and reads the command written to the first memory area. If the read command is a real-time command, the control unit executes the real-time command with priority with respect to a normal command, and if the read command is a normal command, the control unit writes the normal command to the second memory area for subsequent reading and execution from the second memory area.

When a command written to a first memory area is a real-time command, the command is executed with priority over normal commands after being read, thus enabling executing real-time commands immediately (in real time). By writing normal commands (not including real-time commands) in a second memory area in the order received, normal commands written to the second memory area can be sequentially read and executed when a real-time command is not being executed. A simple operation can therefore be executed continuously in the second memory area without considering the presence of real-time commands, that is, normal commands can be sequentially executed. If a normal command is received in the first memory area between real-time commands, all of the received commands can be temporarily stored and the process determined when the commands are read from the first memory area. Managing commands in a first memory area and second memory area is therefore simple, and execution is faster.

Another aspect of the invention involves the situation when available storage capacity in the second memory area is less than a specific amount. In that event, the control unit sends to the control device a notice that the available storage capacity in the second memory area is less than the specific amount, writes and reads any command received from the control device to the first memory area and reads the command written to the first memory area after sending the notice, and if the read command is a normal command, does not write the normal command to the second memory area.

If a command is sent from the control device after the control device was informed that the available storage capacity is less than a specific amount, such as when the second memory area (buffer) is full, essential real-time commands can be executed while skipping and not storing normal commands to the second memory area. The available storage capacity is the area other than the memory occupied by stored commands that have not been executed, and represents space to which new commands can be stored. Normally, if the available storage capacity in the second memory area is less than the specific amount, commands received from the control device cannot be stored. Because the buffer full report may be sent to the control device at substantially the same time as and the time at which the control device sends a command, the specific amount can be set so that at least one real-time command can be easily read, and can be set to the level at which there is space for one command. Because plural real-time commands could be sent at one time, the size of the available storage capacity may be sufficient to hold more than one real-time command, such as two.

Another aspect of the invention pertains to details concerning the writing and reading of commands. More particularly, when writing a command received from the control unit to the first memory area, the control unit writes to the position in the first memory area indicated by a first write pointer and then moves the first write pointer to a next command write position in the first memory area, when the command is received from the control device; and when reading the command written to the first memory area, the control unit reads the command written at the position in the first memory area indicated by a first read pointer that tracks the first write pointer. If the read command is a real-time command, after executing the real-time command, the control unit moves the first read pointer to the next command position in the first memory area, and if the read command is a normal command, when writing the normal command to the second memory area, the control unit writes the normal command at the position in the second memory area indicated by a second write pointer and then moves the second write pointer to the position for writing a next normal command in the second memory area. A second read pointer that follows the second write pointer indicates a position at which the normal command to read and executed is located in the second memory area, and after the normal command is read and executed, the control unit moves the second read pointer to the position of the next normal command in the second memory area.

The area for writing a command and the area for reading a command in each memory area are managed by pointers that point to specific positions. If the process that manages the pointers can be simplified and accelerated, the process that manages commands in the memory area can also be simplified and accelerated, the program that enables the pointer management process can be simplified, ease of development can be improved, and the production cost can be reduced.

As a result, because the control unit in this aspect of the invention can move the position of a first write pointer based on writing a received command with no relationship to other pointers, pointer management is easy. In addition, because the control unit can move the position of a first read pointer based on reading a command written to the first memory area so that the first read pointer follows the first write pointer, pointer management is easy.

In addition, because the control unit can move the position of a second write pointer with no relationship to other pointers based on writing a received command to the second memory area, pointer management is easy. In addition, because the control unit can move the position of a second read pointer based on reading a command written to the second memory area so that the second read pointer follows the second write pointer, pointer management is easy.

Simplifying pointer management can also be achieved while satisfying the need to immediately execute real-time commands.

In accordance with another aspect of the invention, when available storage capacity in the second memory area is less than a specific amount, the control unit is configured to take certain actions. When that condition occurs, the control unit sends to the control device a report that the available storage capacity in the second memory area is less than the specific amount. If a command is received from the control device after the report was sent, the control unit, in writing the command to the first memory area, writes the command at a position in the first memory area indicated by the first write pointer and then moves the first write pointer to a position for writing a next command in the first memory area. If the command read from the position in the first memory area indicated by the first read pointer is a real-time command, the control unit executes the real-time command with priority with respect to the normal command and then moves a first read pointer to the position of the next command in the first memory area, and if the read command is a normal command, the control unit moves the first read pointer to the position to which the next command was written without writing the normal command to the second memory area.

When the available storage capacity in the second memory area becomes less than the specific amount, the control device is informed, and a command is still sent from the control device, essential real-time commands can be executed, and normal commands can be discarded without being stored.

Another aspect of the invention is embodied a method of controlling a recording device capable of connecting to a control device and including a first memory area and a second memory area that is different from the first memory area. The control method includes steps of: writing a command, when received from the control device, to the first memory area, and reading the command written to the first memory area. If the read command is a real-time command, the method further includes executing the real-time command with priority with respect to a normal command, and if the read command is a normal command, the method further includes writing the normal command to the second memory area for subsequent reading and execution from the second memory area.

When a command written to a first memory area is a real-time command, the command is executed with priority over normal commands after being read, thus enabling executing real-time commands immediately (in real time). By writing normal commands not including real-time commands in a second memory area in the order received, normal commands written to the second memory area can be sequentially read and executed when a real-time command is not being executed. A simple operation can therefore be executed continuously in the second memory area without considering the presence of real-time commands, that is, normal commands can be sequentially executed. If a normal command is received in the first memory area inserted between real-time commands, all of the received commands can be temporarily stored and the process determined when the commands are read from the first memory area. Managing commands in a first memory area and second memory area is therefore simple, and execution is faster.

Another aspect of the invention is embodied in a storage medium storing a program for execution by a control unit that controls parts of a recording device capable of connecting to a control device and including a first memory area and a second memory area that is different from the first memory area. The program, when executed, causes the control unit to perform the operations described above with respect to the method.

By running this program, when a command written to a first memory area is a real-time command, the command is executed with priority over normal commands after being read, thus enabling executing real-time commands immediately (in real time). By writing normal commands not including real-time commands in a second memory area in the order received, normal commands written to the second memory area can be sequentially read and executed when a real-time command is not being executed. A simple operation can therefore be executed continuously in the second memory area without considering the presence of real-time commands, that is, normal commands can be sequentially executed. If a normal command is received in the first memory area inserted between real-time commands, all of the received commands can be temporarily stored and the process determined when the commands are read from the first memory area. Managing commands in a first memory area and second memory area is therefore simple, and execution is faster.

EFFECTS OF THE INVENTION

The invention simplifies the management and accelerates the handling of commands in a buffer while satisfying the need to immediately execute real-time commands.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures.

Figure 1:
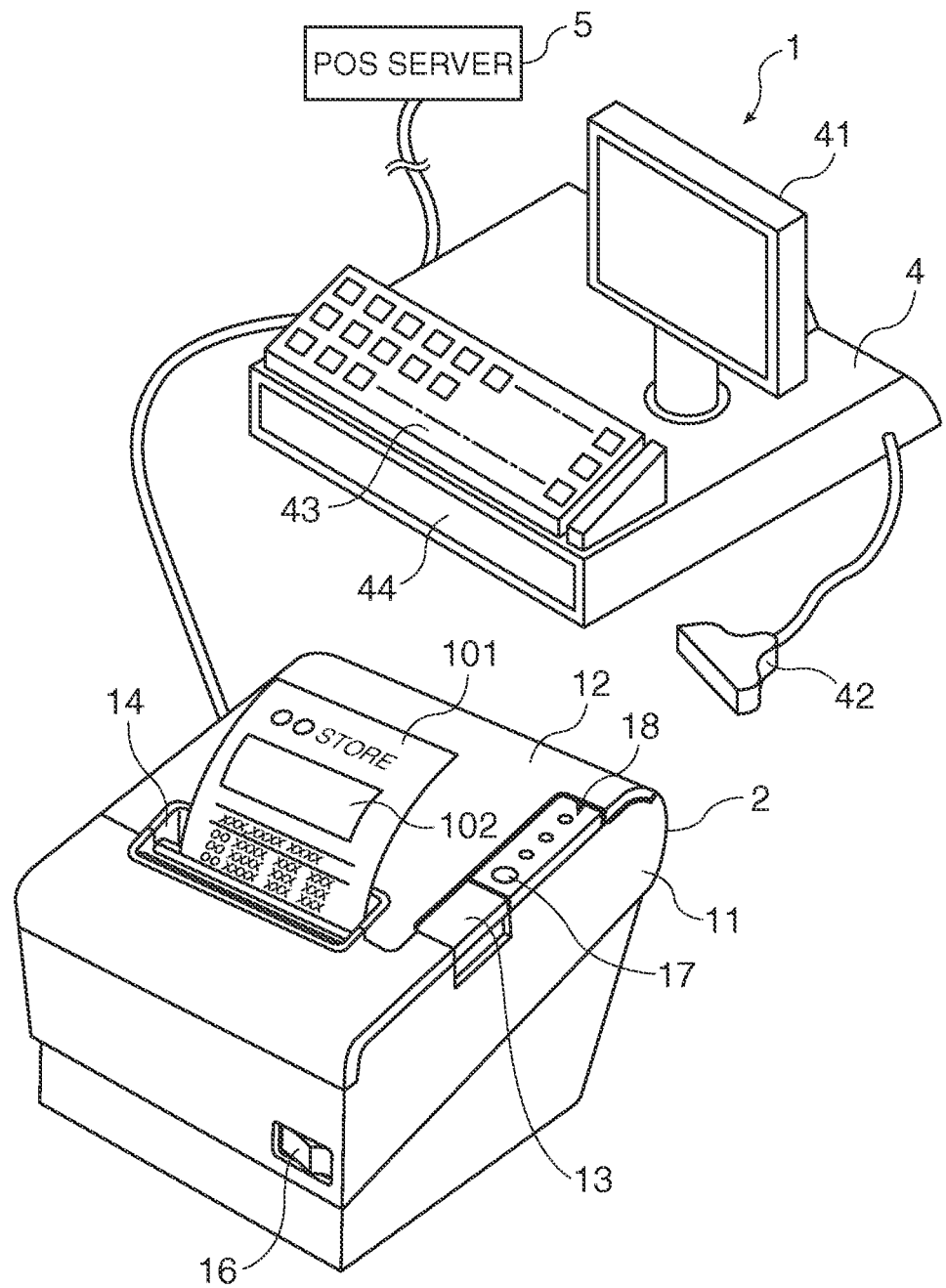
FIG. 1 shows an exemplary configuration of a POS terminal.

FIG. 1 shows a basic configuration of a POS terminal 1 according to a preferred embodiment of the invention. In the illustrated embodiment, the POS terminal 1 is a cash register installed at a checkout counter in a retail store, for example, for processing sales transactions, and is part of a POS system.

The POS terminal 1 includes a printer 2 (recording device) that produces receipts 101 and that is connected to a host computer 4 (control device) that executes a sale transaction process and payment process. The host computer 4 is connected through a communication line to a POS server that stores sale transaction information. The host computer 4 includes a display 41 that displays the content of the sale transaction process and payment process, a barcode scanner 42 that reads barcodes affixed to the products in the sale transaction process, a keyboard 43 with keys including an ENTER key, and a cash drawer 44 that stores cash used for payment processing. As described below, the cash drawer 44 is connected to the printer 2, and opens when an open drawer signal input from the printer 2 is received.

The printer 2 carries thermal roll paper as the recording medium inside the case 11, prints (records) an image on the roll paper using a recording head, and outputs a receipt 101. The printer 2 has a roller platen (not shown in the figure) that conveys the roll paper, a recording head disposed opposite the platen, and a cutter unit (not shown in the figure) that cuts the roll paper near the paper exit 14. The recording head of the printer 2 according to this embodiment of the invention is, for example, a line thermal head having heat elements (not shown in the figure) arrayed in one or a plurality of lines across the width of the roll paper. The heat elements are individually energized by the print engine 20 described below, and cause the roll paper to change color as a result of heat elements in contact with the printing surface (recording surface) of the roll paper applying heat energy to the roll paper.

As the roll paper is printed on by the recording head, the paper is conveyed outside from a paper exit 14 formed in the top of the case 11, cut by the cutter unit, and output as a receipt 101. The receipt 101 includes the name of the store, the name, quantity, and price of the purchased products, and the total sale amount printed as text or logo images.

As shown in FIG. 1, a cover 12 is disposed to the case 11 of the printer 2. A lever 13 for opening the cover 12 is disposed to the case 11, and when the cover 12 opens, the space in which the roll paper is stored is exposed, enabling adding or replacing roll paper. Also disposed to the case 11 are a power switch 16 for turning the printer 2 power on and off; a paper feed switch 17 for asserting a roll paper feed command or an operation that changes the operating mode under specific control conditions; and an LED panel 18 for displaying the operating status of the printer 2, for example.

The printer 2 drives a paper feed motor that causes the platen roller to turn and convey the roll paper, a cutter drive motor that drives the cutter unit to cut the roll paper, and the recording head to record text and images on the roll paper.

Figure 2:
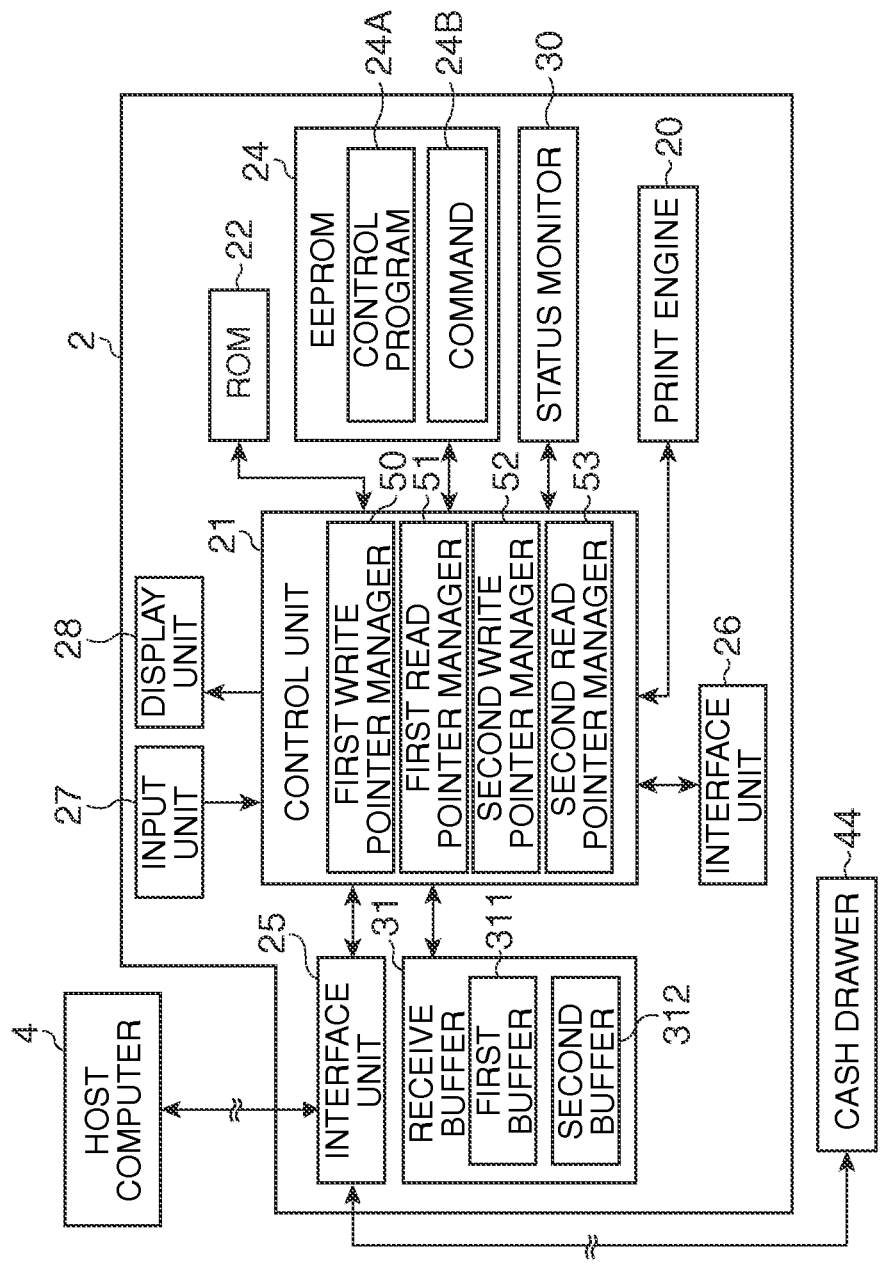
FIG. 2 is an exemplary block diagram showing the functional configuration of a printer.

FIG. 2 is a block diagram showing the functional configuration of the printer 2.

The printer 2 includes a print engine 20 that does the actual printing; a control unit 21 that controls operation of the printer 2; ROM 22 that stores a basic control program run by the control unit 21; EEPROM 24, which is nonvolatile memory storing a control program 24A run by the control unit 21 and command 24B; an interface unit 25 for data communication with the host computer 4 and cash drawer 44 as controlled by the control unit 21; an input unit 27 that detects operation of the paper feed switch 17 (FIG. 1); a display unit 28 that controls the LED panel 18 to display information; a status monitor 30 that monitors the operating state of parts of the printer 2; and a receive buffer 31 (first buffer 311 (first memory area)) and second buffer 312 (second memory area) which are RAM devices rendered as ring buffers for cyclically temporarily storing data received from the host computer 4. A ring buffer stores data sequentially from the first address, returns to the first address after reaching the end of the ring buffer, and enables using memory efficiently.

The print engine 20 creates the text and images printed on the roll paper as the recording medium based on print data sent from the host computer 4 as controlled by the control unit 21, and operates the recording head, cutter drive motor, and paper feed motor while monitoring the detection values from sensors including a paper end sensor and remaining paper sensor to print on the roll paper.

The printer 2 thus has a recording head that deposits ink or toner on the printing surface of the paper, plastic, or other recording medium (such as roll paper, cut-sheet paper, photocopier paper), or applies heat to the printing surface of the recording medium; a recording head drive mechanism that moves the recording head relative to the recording medium; and a conveyance mechanism that conveys the recording medium. The recording head and other mechanisms are controlled by the print engine 20.

The print engine 20 operates the paper feed motor and conveys the roll paper a specific distance as controlled by the control unit 21 when the input unit 27 detects operation of the paper feed switch 17, and changes the on/off state of the LEDs in the LED panel 18 by means of the display unit 28 according to the operating status of the printer 2.

The control unit 21 has a CPU, internal memory used as working memory to temporarily store executed programs and data, functions as a microprocessor, and runs the basic control program stored in ROM 22 and the control program 24A stored in EEPROM 24.

ROM 22 nonvolatilely stores the basic control program whereby the control unit 21 initializes and controls other parts of the printer 2, and data related to the basic control program.

EEPROM 24 is a rewritable, nonvolatile memory device that stores programs and data, including the control program 24A and command 24B.

The interface unit 25 has an interface such as a USB or RS232C interface, and communicates as controlled by the control unit 21 with the host computer 4 according to a specific standard by wire or wirelessly.

Detectors that detect the supply voltage from an external source to the printer 2, whether the cover 12 is open or closed, whether roll paper is loaded, and other conditions are connected to the status monitor 30 of the printer 2. In accordance with the detection results, the status monitor 30 outputs detection signals as interrupt signals to the control unit 21. These detection signals may indicate an abnormal supply voltage to the printer 2; if the printer 2 cover 12, which is opened and closed to add paper or replace the ink cartridge, is open; if the printer 2 is out of paper; and the occurrence of specific events in the printer 2, such as operation of the paper feed switch 17.

A printer driver, which is a program for controlling the printer 2, is installed in the host computer 4. To control the printer 2 and run the process for printing a receipt 101, the host computer 4 reads and runs the printer driver to generate commands for controlling the printer 2 and sequentially send the generated commands to the printer 2.

When a command is received, the control unit 21 of the printer 2 temporarily writes the received commands in the order received to the receive buffer 31, sequentially executes the commands written to the receive buffer 31, and thereby sequentially executes the processes related to issuing a receipt 101. This operation is described in further detail below.

Printer 2 operating modes include an on-line mode (normal mode) in which communication with the host computer 4 and printing are possible, and an off-line mode (buffer full mode) in which only minimum essential operations are possible.

The off-line mode stops operation of the print mechanism including the printhead when continuing the printing operation is inappropriate and limits command communication with the host computer 4 to protect the printer and communication data and assure user safety.

Transition to the off-line mode is triggered by specific off-line trigger events such as the cover 12 opening or the paper supply running out, and by the second buffer 312 becoming full as described below. After entering the off-line mode, the control unit 21 changes the operating mode to the on-line mode when, for example, the status monitor 30 detects elimination of the off-line trigger event.

When the off-line mode is entered, the control unit 21 informs the host computer 4 that the off-line mode was entered. While the printer 2 is in the off-line mode, the host computer 4 interrupts outputting normal commands to the printer 2, but continues to output real-time commands as required to immediately execute specific processes of greater importance or urgency than normal commands.

As further described below, the printer 2 according to this embodiment of the invention immediately executes real-time commands when a real-time command is received even if the operating mode was set to the off-line mode because the second buffer 312 is full (in which case the off-line mode is referred to as a buffer full mode).

The process whereby the printer 2 according to this embodiment of the invention manages commands received from the host computer 4 is described next.

Figures 3A, 3B:
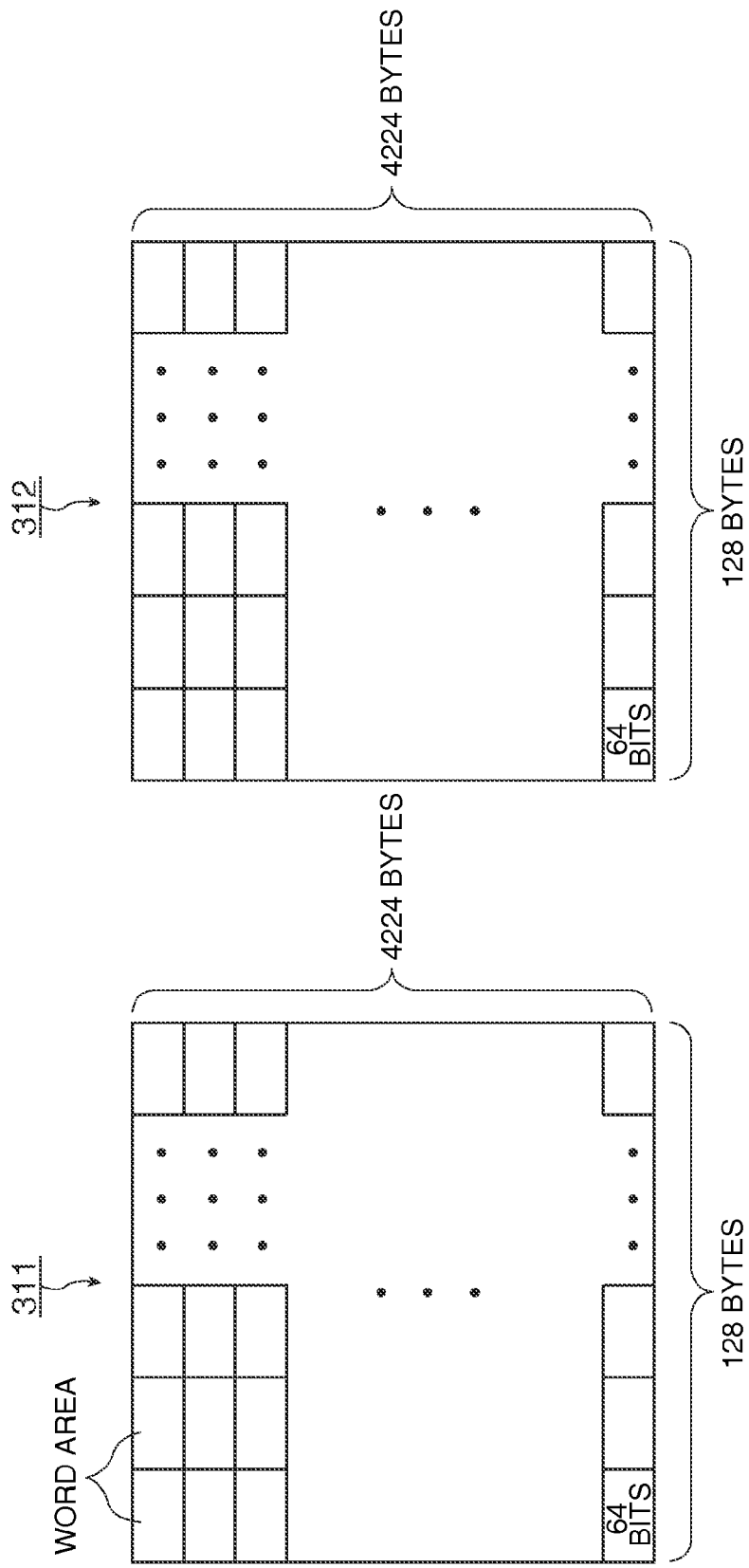
FIG. 3A and FIG. 3B show an exemplary receive buffer.

FIG. 3A shows the structure of a first buffer 311 (first memory area), and FIG. 3B shows the structure of a second buffer 312 (second memory area).

The printer 2 according to this embodiment of the invention uses two buffers as the receive buffer 31, a first buffer 311 and a second buffer 312 which are formed in different memory areas.

Note that the structure of the first buffer 311 and second buffer 312 shown in FIG. 3A and FIG. 3B is a structure suited to describing the invention while simplifying description of the invention.

As shown in FIG. 3A and FIG. 3B, the capacity of the first buffer 311 in this embodiment is 4224 bytes. The storage area of the first buffer 311 is divided into word-length blocks where one word is 64 bits long, and an address is assigned to each block. These word-length blocks are referred to as "word areas" below.

The structure of the second buffer 312 is identical to the first buffer 311, and further description thereof is omitted.

These buffers are ring buffers, and data is written cyclically by word area units.

The process of managing commands in the first buffer 311 and second buffer 312 configured as described above is described next.

Note that in the example described below one command is 64 bits long, one command is written to one word area, normal commands and real-time commands are sent from the host computer 4 to the printer 2, and other types of data are not sent.

In addition, the functions of the control unit 21, first write pointer manager 50, first read pointer manager 51, second write pointer manager 52, and second read pointer manager 53 are achieved by cooperation of hardware and software, such as a CPU (control unit) reading and running a program.

When a command is received from the host computer 4, the control unit 21 writes the received command sequentially to the word area identified by first write pointer W1.

The first write pointer W1 is a pointer to the word area for writing the command in the first buffer 311, and is managed by a first write pointer manager 50 in the control unit 21.

A pointer stores a single address assigned to a specific word area, and identifies the word area identified by that single address. The pointer could be a variable that is defined by the pointer management program (such as a program contained in firmware for rendering the function of the first write pointer manager 50), or data stored in a specific area in RAM, for example.

To describe the operation of the first write pointer manager 50, the control unit 21 first writes a received command to the word area denoted by the first write pointer W1. The first write pointer manager 50 then shifts the word area denoted by the first write pointer W1 to the next word area after the word area to which the command was written. More specifically, the first write pointer manager 50 changes the address of the word area stored in the first write pointer W1 to the address of the next word area after the word area to which the command was written.

After the control unit 21 finishes writing a command to the one word area identified by the first write pointer W1, the first write pointer manager 50 thus changes the word area identified by the first write pointer W1 to the next word area after the one word area to which the command was written. As a result, when a new command is received from the host computer 4, the control unit 21 writes the next command received to the word area next after the word area to which the last command was written, and commands are thus sequentially written in the order received to the first buffer 311.

Figure 4:
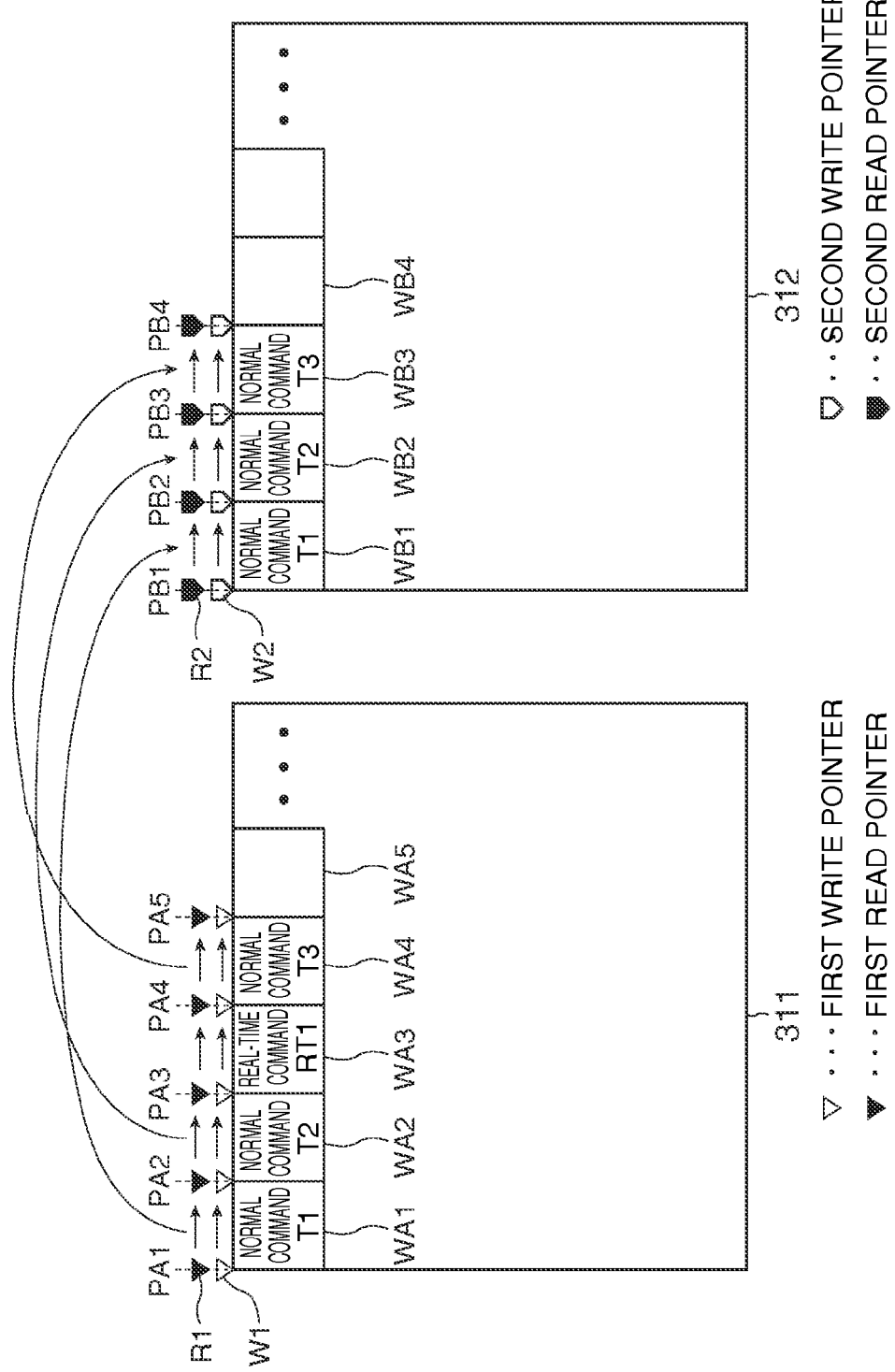
FIG. 4 shows further feature of an exemplary receive buffer.

FIG. 4 schematically illustrates the first buffer 311 and second buffer 312, as well as the process of managing commands in the receive buffer 31.

FIG. 4 shows the word areas pointed to by the first write pointer W1 in the first buffer 311 by the positions of the first write pointer W1 markers.

The operation of the first write pointer manager 50 is described next with reference to FIG. 4. When the first write pointer W1 points to word area WA1 (position PA1) and a normal command T1 is received, the control unit 21 writes the normal command T1 to word area WA1. The first write pointer manager 50 then moves the word area denoted by the first write pointer W1 to word area WA2 (position PA2).

As described above, the commands received from the host computer 4 include normal commands and real-time commands, but this embodiment of the invention first writes the received commands to the first buffer 311 regardless of the command type.

Note that changing the word area identified to by a pointer from the current word area to the next word area is referred to below as simply "moving the pointer to the next word area."

The control unit 21 also applies the following process to the commands written to the first buffer 311.

More specifically, the control unit 21 reads the command written to the word area indicated by the first read pointer R1. The first read pointer R1 is a pointer to the word area in the first buffer 311 from which the next command is to be read, and is managed by the first read pointer manager 51. Because the first read pointer R1 is a pointer to the area from which a command already written to the first buffer 311 is to be read, the first read pointer R1 moves with the first write pointer W1.

The control unit 21 then interprets the read command, and determines if the command is a normal command or a real-time command. Each command in this embodiment contains data identifying the command as a normal command or a real-time command, and the control unit 21 uses this data to determine the type of command read. Note that each command could contain a flag that indicates whether the command is a normal command or a real-time command, and the control unit 21 could determine the type of command from the state of this flag.

If the read command is a real-time command, the control unit 21 promptly executes the real-time command. More specifically, the control unit 21 executes the real-time command with priority over normal commands. As a result, real-time commands can be executed immediately upon being received. Next, the first read pointer manager 51 moves the first read pointer R1 to the next word area. Note that executing a real-time command promptly (immediately or in real time) as used herein means the real-time command is executed with priority to normal commands. This is because, as described above, real-time commands are commands with greater urgency than normal commands and require immediate execution, which must be assured by executing real-time commands with priority over normal commands.

If the read command is a normal command, the control unit 21 does not immediately execute the normal command, and instead writes (copies) the normal command to the word area identified by second write pointer W2 in second buffer 312. The second write pointer W2 is a pointer to the word area in second buffer 312 to which the next command should be written, and is managed by a second write pointer manager 52. Next, the first read pointer manager 51 moves the position of the first read pointer R1 to the next word area, and the second write pointer manager 52 moves the position of the second write pointer W2 to the next word area.

In other words, when the command read from the first buffer 311 is a normal command, the control unit 21 does not execute the normal command.

This is described more specifically using FIG. 4, which shows receiving commands from the host computer 4 in the order normal command T1, normal command T2, real-time command RT1, normal command T3.

In this case the commands are written sequentially by the control unit 21 to the first buffer 311, and when the last command, normal command T3, is received, the first write pointer W1 is set to word area WA5 (position PA5).

As the commands are written to the first buffer 311, the control unit 21 sequentially reads the commands written to the first buffer 311, and for each command executes a process corresponding to the type of command.

More specifically, referring to FIG. 4, the control unit 21 first reads and interprets the normal command T1 written to the word area WA1 denoted by the first read pointer R1 at position PA1 in the first buffer 311, and determines the normal command T1 is a normal command. Next, the control unit 21 writes (copies) the normal command T1 as data to the word area WB1 denoted by the second write pointer W2 at position PB1 in the second buffer 312 without executing the normal command T1.

Next, the first read pointer manager 51 moves the first read pointer R1 to position PA2, and the second write pointer manager 52 moves the second write pointer W2 to position PB2.

When the command read from the first buffer 311 is a normal command, the control unit 21 thus writes (copies) the normal command to the second buffer 312 without executing the normal command. As a result, when the read command is a normal command, the time required from when reading starts to the start of reading the next command (including the time required for the first read pointer manager 51 and second write pointer manager 52 processes) is significantly shorter than when commands are executed as they are read. For example, the normal command T1 may be a command for driving the paper feed motor. Because the control unit 21 writes the normal command T1 to the second buffer 312 without executing the command in this case, the time until the control unit 21 starts reading the next command is extremely short compared with when the normal command T1 is read and then executed (to actually drive the paper feed motor).

Next, the control unit 21 reads the normal command T2 written to word area WA2 denoted by first read pointer R1 in the first buffer 311, and because the read command is a normal command, writes the normal command T2 to the word area WB2 denoted by second write pointer W2 without executing the normal command T2. After writing, the first read pointer manager 51 moves the first read pointer R1 to position PA3, and the second write pointer manager 52 moves the second write pointer W2 to position PB3.

Next, the control unit 21 reads and interprets the real-time command RT1 written to word area WA3 identified by first read pointer R1 in the first buffer 311 at position PA3, and determines that the real-time command RT1 is a real-time command. The control unit 21 then immediately executes the real-time command RT1.

As described above, normal commands are written to word area WA1 and word area WA2, and these normal commands are not executed and are skipped. As a result, the first read pointer moves in an extremely short time from position PA1, to position PA2, to position PA3. As a result, the control unit 21 starts reading real-time command RT1 an extremely short time after starting to read the normal command T1 written to first buffer 311, and the ability to immediately execute the real-time command RT1 is assured.

After the real-time command RT1 is executed by the control unit 21, the first read pointer manager 51 moves the position of the first read pointer R1 to the next word area.

Next, the control unit 21 reads the normal command T3 written to word area WA4 denoted by first read pointer R1 in the first buffer 311, and because the read command is a normal command, writes the normal command T3 to the word area WB3 denoted by second write pointer W2 without executing the normal command T3. After writing, the first read pointer manager 51 moves the first read pointer R1 to position PA5, and the second write pointer manager 52 moves the second write pointer W2 to position PB4.

As described above, normal commands that are not executed when read from the first buffer 311 are sequentially written to the second buffer 312. The control unit 21 then sequentially reads and executes the normal commands written to the second buffer 312.

More specifically, the control unit 21 reads and executes the command stored in the word area identified by the second read pointer R2 in the second buffer 312. The second read pointer R2 is a pointer to the word area in the second buffer 312 from which a command should be read, and is managed by the second read pointer manager 53. Because the second read pointer R2 is a pointer to the area from which a command that was already written to the second buffer 312 should be read, the second read pointer R2 tracks the second write pointer W2.

When a command stored in one word area is read and executed by the control unit 21, the second read pointer manager 53 changes the word area pointed to by the second read pointer R2 to the next word area after the one word area. As a result, the normal commands written to the second buffer 312 are sequentially read and executed by the control unit 21.

The operation of the first write pointer manager 50 is described next using FIG. 4. In this example normal commands T1, T2, T3 have already been written to word areas WB1, WB2, WB3, respectively.

When the second read pointer R2 points to word area WB1 (position PB1), the control unit 21 reads and executes the normal command T1 from word area WB1. After the control unit 21 executes normal command T1, the second read pointer manager 53 changes the word area pointed to by the second read pointer R2 to word area WB2 (position PB2). Reading and executing the normal command from the word area denoted by the second read pointer R2 by means of the control unit, and moving the second read pointer R2 by means of the second read pointer manager 53, thereafter alternately repeat, and normal commands T1, T2, and T3 are sequentially executed by the control unit 21.

In this embodiment of the invention as described above, managing writing and reading commands in the first buffer 311 using the first write pointer W1 and first read pointer R1, and managing writing and reading commands in the second buffer 312 using the second write pointer W2 and second read pointer R2, has the following advantages.

More specifically, when a real-time command is received from the host computer 4, the real-time command is immediately executed and the need to immediately execute real-time commands can therefore be satisfied. Furthermore, while meeting the need to immediately execute real-time commands, the pointers can be very easily managed and processing is therefore faster.

This is because the first write pointer manager 50 can move the position of the first write pointer W1 according to the command written by the control unit 21 without considering the relationship to other pointers, and pointer management is therefore much easier and processing is faster than when, for example, a write pointer and a read pointer dedicated to real-time commands are used, and the first write pointer W1 must be managed while adjusting the relationship to the dedicated real-time command pointers.

In addition, because the first read pointer manager 51 can move the position of the first read pointer R1 according to the control unit 21 reading commands written to the first buffer 311 while ensuring that the first read pointer R1 does not pass the first write pointer W1, the first read pointer R1 can be managed much more easily and processing is faster than when moving the first read pointer R1 is limited by conditions other than simply not passing the first write pointer W1.

Yet further, because the second write pointer manager 52 can move the position of the second write pointer W2 according to the control unit 21 writing a normal command to the second buffer 312 without considering the relationship to other pointers, managing the second write pointer W2 is much easier and processing is faster than when, for example, a write pointer and a read pointer dedicated to real-time commands are used, and the second write pointer W2 must be managed while adjusting the relationship to the dedicated real-time command pointers.

In addition, because the second read pointer manager 53 can move the position of the second read pointer R2 according to the control unit 21 reading a normal command written to the second buffer 312 while ensuring that the second read pointer R2 does not pass the second write pointer W2, the second read pointer R2 can be managed much more easily and processing is faster than when moving the second read pointer R2 is limited by conditions other than simply not passing the second write pointer W2.

Operation when the second buffer 312 becomes full in this embodiment is described next.

The second buffer 312 becoming full means that the available storage capacity in the second buffer 312 is less than or equal to a specific threshold TH1 (such as 128 bytes).

The available storage capacity in the second buffer 312 is the space in the second buffer 312 other than the areas where normal commands that have not been executed are stored, and more specifically is the area that is past the second write pointer W2 and before the second read pointer R2 (that is, between and not including the areas identified by the second write pointer W2 and second read pointer R2).

Note that the first buffer 311 can theoretically become full. However, because normal commands stored in the word areas in the first buffer 311 are written as data to the second buffer 312 without executing the normal commands, and the first read pointer R1 is then moved to the next word area in this embodiment as described above, the pace at which the first read pointer R1 advances is extremely unlikely to be significantly slower than the pace at which the first write pointer W1 advances, and the capacity of available storage space in the first buffer 311 is extremely unlikely to go to or below the specific threshold TH1. If the first buffer 311 becomes full, the likelihood is high that some error occurred and the buffer became full as a result of the error. This embodiment of the invention therefore determines that an error occurred when the first buffer 311 becomes full, interrupts processing, and prompts the user to resolve the error.

Figure 5:
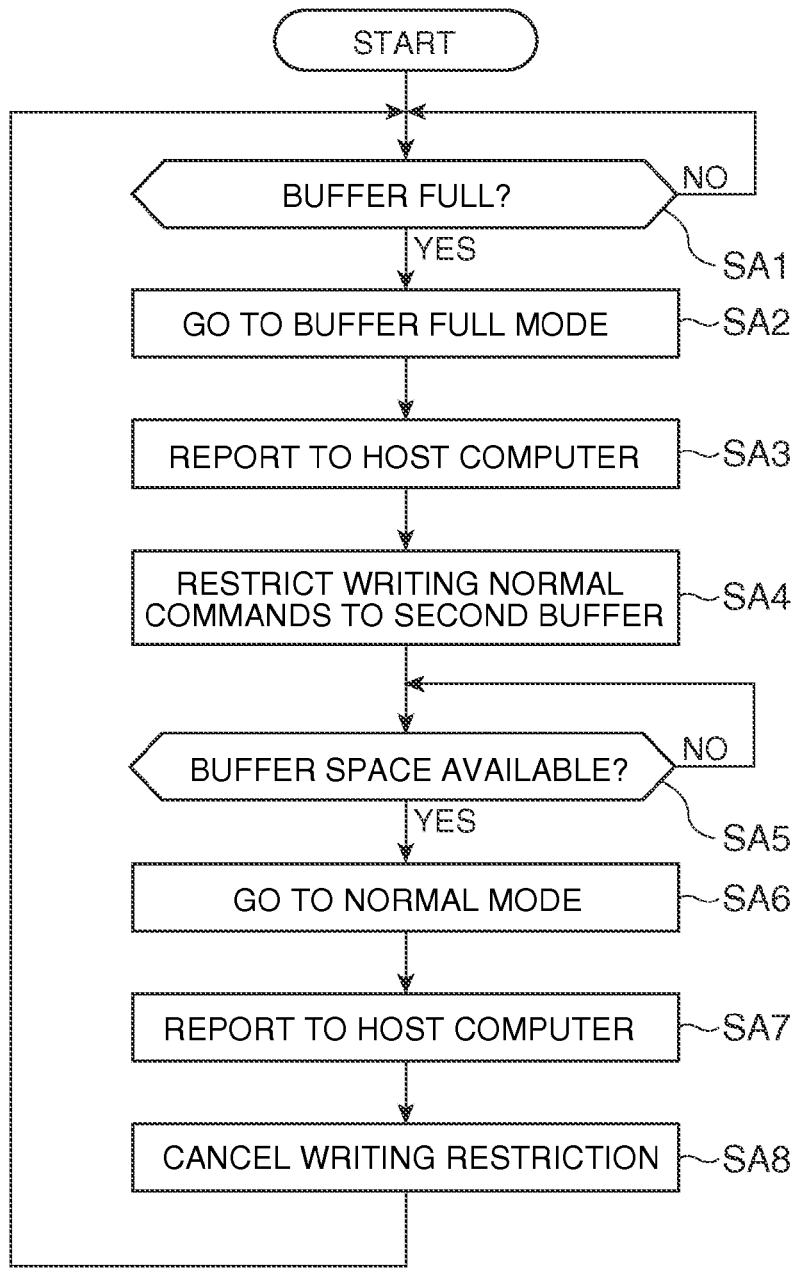
FIG. 5 is a flow chart of printer operation according to embodiments of the invention.

FIG. 5 is a flow chart of the operation of the printer 2 when the second buffer 312 becomes full.

The control unit 21 of the printer 2 monitors if the available storage capacity of the second buffer 312 is less than or equal to the specific threshold TH1 (step SA1).

If the available storage capacity in the second buffer 312 is the specific threshold TH1 or less (step SA1 returns Yes), the control unit 21 changes the operating mode from the normal mode to the buffer full mode (step SA2), and informs the host computer 4 that the operating mode is now the buffer full mode (step SA3).

Note that the specific threshold TH1 is a reference value for determining if the second buffer 312 is full or not. More specifically, because the host computer 4 could be informed that the buffer is full in step SA3 substantially simultaneously to the host computer 4 sending some command to the printer 2, the specific threshold TH1 can be set to a level sufficient to store one command so that at least one real-time command can be received. Considering that plural real-time commands may be sent after the report in step SA3, the size of the available storage capacity could also be set to accommodate more than one real-time command, such as two commands.

Because this buffer full mode is a type of off-line mode, command execution is stopped, the print mechanism is temporarily stopped, and the commands that can be exchanged between the printer 2 and host computer 4 are limited in order to save the received data and eliminate the full buffer state.

After detecting that the operating mode changed to the buffer full mode as a result of step SA3, the host computer 4 then performs the off-line mode operations.

More specifically, the commands output from the host computer 4 to the printer 2 are limited to real-time commands, and the host computer 4 basically outputs only real-time commands to the printer 2. After the printer 2 enters the buffer full mode, execution of operations called by commands other than real-time commands output from the host computer 4 to the printer 2 is not guaranteed.

Note that normal commands may be output from the host computer 4 to the printer 2 after the printer 2 enters the buffer full mode due to the timing of the report sent in step SA3 or other reason.

Next, the control unit 21 limits writing normal commands to the second buffer 312 when the command read from the first buffer 311 is a normal command (step SA4).

More specifically, when the operating mode is the normal mode, the control unit 21 reads commands written to the first buffer 311 from the word area identified by the first read pointer R1, and determines the type of the command read. If the command type is a real-time command, the control unit 21 immediately executes the real-time command, and the first read pointer manager 51 moves the position of the first read pointer R1 to the next word area. If the read command is a normal command, the control unit 21 writes the normal command to the second buffer 312 without executing the normal command, and the first read pointer manager 51 moves the position of the first read pointer R1 to the next word area.

If the operating mode is the buffer full mode and the command read from the area identified by the first read pointer R1 is a real-time command, the control unit 21 executes the real-time command immediately with priority over the normal commands in the same way as when the operating mode is the normal mode, and the first read pointer manager 51 then moves the position of the first read pointer R1 to the next word area. Unlike when the operating mode is the normal mode, however, if the read command is a normal command, the control unit 21 does not execute the normal command, does not write the normal command to the second buffer 312, and only moves the position of the first read pointer R1 by means of the first read pointer manager 51.

By thus limiting operation, the need to immediately execute real-time commands is met while normal commands received after entering the buffer full mode, that is, only normal commands for which execution is not assured, are not executed, and processing appropriate to the actual operating status is possible.

The pointer management process is the same in this embodiment whether the operating mode is the normal mode or the buffer full mode.

More specifically, in the buffer full mode, the first write pointer manager 50 moves the position of the first write pointer W1 based on the control unit 21 writing commands in the same way as in the normal mode.

In the buffer full mode, the first read pointer manager 51 also moves the position of the first read pointer R1 based on the control unit 21 reading commands in the same way as in the normal mode.

In the buffer full mode, the second write pointer manager 52 moves the position of the second write pointer W2 based on the control unit 21 writing normal commands. Note that because writing normal commands to the second buffer 312 by the control unit 21 is restricted in the buffer full mode, moving the second write pointer W2 is also restricted as a result of managing the second write pointer W2 in the same way as in the normal mode.

In the buffer full mode the second read pointer manager 53 also moves the position of the second read pointer R2 based on the control unit 21 reading and executing normal commands written to the second buffer 312.

Note that processing is more complicated, conditional branching of the pointer management program is complicated, and ease of development is inhibited when the processes for managing pointers are different in the normal mode and buffer full mode. This embodiment of the invention simplifies processing, however, by using the same process to manage pointers in both the normal mode and buffer full mode.

After restricting writing normal commands to the second buffer 312 in step SA4, the control unit 21 watches for the buffer full state of the second buffer 312 to be resolved (step SA5). When the second buffer 312 becomes full and the available storage capacity in the second buffer 312 then exceeds a specific threshold TH2 (such as 256 bytes when specific threshold TH1 is 128 bytes) that is a specific margin greater than the foregoing specific threshold TH1, the buffer full state of the second buffer 312 is determined to be resolved in this embodiment.

When the buffer full state of the second buffer 312 is resolved (step SA5 returns Yes), the control unit 21 changes the operating mode to the normal mode (step SA6) and informs the host computer 4 accordingly (step SA7). As a result, the host computer 4 stops the off-line mode operation, and resumes the on-line mode operation.

The control unit 21 also cancels restriction of writing to the second buffer 312 in step SA4 (step SA8). As a result, normal commands are no longer discarded, and the normal commands that are received are sequentially written to the second buffer 312 and executed sequentially.

As described above, the control unit 21 in this embodiment of the invention sequentially writes commands received from the host computer 4 to a first buffer 311, and then sequentially reads commands written to the first buffer 311. If the read command is a real-time command, the control unit 21 executes the real-time command. If the read command is a normal command, the control unit 21 writes the normal command to the second buffer 312 without reading and executing the normal command. The control unit 21 then sequentially reads and executes the normal commands written to the second buffer 312.

More specifically, the control unit 21 repeats the operating sequence of writing commands received from the host computer 4 to the address identified by the first write pointer W1 in the first buffer 311, then moving the first write pointer W1 to the position identifying the area for writing the next command, and reading the command written to the address identified by the first read pointer R1, which follows the first write pointer W1; executing the real-time command and moving the first read pointer R1 to the position identifying the address to which the next command was written if the read command is a real-time command; writing the normal command to the area identified by the second write pointer W2 in the second buffer 312, moving the second write pointer W2 to the position identifying the address for writing the next normal command, and moving the second read pointer R2 to the position identifying the address to which the next command was written if the read command was a normal command; and reading and executing the normal command written to the area identified by the second read pointer R2, which follows the second write pointer W2, and moving the second read pointer R2 to the position identifying where the next normal command was written.

As a result, real-time commands included in the commands written to the first buffer 311 are read and immediately executed, and the need to immediately execute real-time commands can therefore be satisfied. Managing commands in the receive buffer 31 is also simplified because normal commands not including real-time commands are written in the order received to the second buffer 312, and normal commands can be sequentially executed by continuously performing the simple task of sequentially reading and executing the commands written in the second buffer 312 without needing to consider the presence of real-time commands.

This embodiment uses pointers to manage the area for writing commands in the receive buffer 31 and the area for reading commands.

Simplifying the pointer management process in this case helps simplify the process of managing commands in the receive buffer 31, simplify the program enabling the pointer management process, improve the ease of development, and reduce the cost of manufacture.

As a result, managing the first write pointer W1 in this embodiment is easy because the control unit 21 can move the first write pointer W1 based on writing received commands without considering the relationship to other pointers. Managing the first read pointer R1 is also simple because the control unit 21 can move the first read pointer R1 based on reading commands written to the first buffer 311 while assuring the pointer continues tracking the first write pointer W1. Managing the second write pointer W2 is also simple because the control unit can move the second write pointer W2 based on writing to the second buffer 312 without considering the relationship to other pointers. Managing the second read pointer R2 is also simple because the control unit 21 can move the second read pointer R2 based on reading commands written to the second buffer 312 while assuring the pointer continues tracking the second write pointer W2. Thus simplifying pointer management is also achieved while satisfying the need to immediately execute real-time commands.

When the second buffer 312 is full and the command read from the first buffer 311 is a real-time command in this embodiment, the control unit 21 immediately executes the real-time command, but if the read command is a normal command, the control unit 21 simply skips the normal command without writing the normal command to the second buffer 312.

More specifically, if the command read from the area identified by the first read pointer R1 is a real-time command, the control unit 21 executes the real-time command and moves the first read pointer R1 to the area where the next command was written. However, if the read command is a normal command, the control unit 21 moves the first read pointer R1 to the area where the next command was written without writing the normal command to the second buffer 312.

As a result, normal commands received after the second buffer becomes full can be skipped while continuing to satisfy the need to immediately execute real-time commands.

The invention is described using a preferred embodiment thereof above, but the invention is not so limited.

The functional parts shown in FIG. 2 can also be desirably achieved by cooperation between hardware and software components, and do not suggest any particular hardware configuration.

The invention is described above using a printer 2 that prints receipts 101 in a POS terminal 1 as an example, but the invention is not so limited. More specifically, a configuration in which a host computer 4 is connected to a stand-alone printer through an appropriate communication means, such as connecting the printer 2 to a plurality of host computers 4 over a LAN, is also conceivable.

The foregoing embodiment also describes a configuration in which the printer 2 has the control unit 21 and receive buffer 31, but a discrete control device that has the control unit 21 and receive buffer 31 and is externally connected to the printer 2 is also conceivable.

A recording device according to the invention can be any type of printer that operates according to commands, and could be an inkjet printer, a dot impact printer, a laser printer, or a dye sublimation printer, for example, a printer that forms text and images using another method, or a printer that is incorporated in another device. A recording device that records to electronic media is also conceivable.

A program according to the invention may also be included in a printer driver installed to the host computer 4.

A program that executes the steps of the flow chart shown in FIG. 5 and is stored to a storage medium inside the printer 2 or is stored to a storage medium external to the printer 2 can also be read and executed by the control unit 21.

The invention having been thus described, it will be apparent to those skilled in the art in light of that description that the invention may be varied in many ways. Any and all such variations are intended to be part of the invention to the extent encompassed by the any of the following claims.

What is claimed is:

1. A recording device capable of connecting to a control device, the recording device comprising:
    a first memory area;
    a second memory area that is different from the first memory area; and
    a control unit that
        controls the first memory area and second memory area,
        writes a command, when received from the control device, to the first memory area,
        reads the command written to the first memory area,
        if the read command is a real-time command, executes the real-time command with priority with respect to a normal command, and
        if the read command is a normal command, writes the normal command to the second memory area for subsequent reading and execution from the second memory area.

2. The recording device described in claim 1, wherein, when available storage capacity in the second memory area is less than a specific amount, the control unit
    sends to the control device a notice that the available storage capacity in the second memory area is less than the specific amount before writing and reading any command received from the control device to the first memory area, and
    if the read command is a normal command, does not write the normal command to the second memory area.

3. The recording device described in claim 1, wherein:
    when writing a command received from the control device to the first memory area, the control unit writes to a position in the first memory area indicated by a first write pointer and then moves the first write pointer to a position for writing a next command in the first memory area, when the command is received from the control device;
    when reading the command written to the first memory area, the control unit reads the command written at the position in the first memory area indicated by a first read pointer that tracks the first write pointer;
        if the read command is a real-time command, after executing the real-time command, the control unit moves the first read pointer to the next command position in the first memory area, and
        if the read command is a normal command, when writing the normal command to the second memory area, the control unit writes the normal command at a position in the second memory area indicated by a second write pointer and then moves the second write pointer to a position for writing a next normal command in the second memory area; and
    wherein a second read pointer that follows the second write pointer indicates a position at which the normal command to be read and executed is located in the second memory area, and after the normal command is read and executed, the control unit moves the second read pointer to the position of the next normal command in the second memory area.

4. The recording device described in claim 3, wherein, when available storage capacity in the second memory area is less than a specific amount, the control unit sends to the control device a report that available storage capacity in the second memory area is less than the specific amount, and if a command is received from the control device after the report was sent, in writing the command to the first memory area, writes the command at a position in the first memory area indicated by a first write pointer and then moves the first write pointer to a position for writing a next command in the first memory area, after executing the real-time command, moves a first read pointer to the position of the next command in the first memory area, and if the read command is a normal command, moves the first read pointer to the next command position without writing the normal command to the second memory area.

5. A method of controlling a recording device capable of connecting to a control device and including a first memory area and a second memory area that is different from the first memory area, the control method comprising steps of:

writing a command, when received from the control device, to the first memory area, and reading the command written to the first memory area;

if the read command is a real-time command, executing the real-time command with priority with respect to a normal command; and if the read command is a normal command writing the normal command to the second memory area for subsequent reading and execution from the second memory area.

6. The method of controlling a recording device described in claim 5, wherein, when available storage capacity in the second memory area is less than a specific amount, the method further comprises steps of:

sending to the control device a notice that the available storage capacity in the second memory area is less than the specific amount;

writing to the first memory area and reading the command written to the first memory area, if a command is received from the control device after sending the notice, and if the read command is a normal command, not writing the normal command to the second memory area.

7. The method of controlling a recording device described in claim 5, further comprising steps of:

when writing a command received from the control device to the first memory area, writing to a position in the first memory area indicated by a first write pointer and then moving the first write pointer to a position for writing a next command in the first memory area, when the command is received from the control device;

when reading the command written to the first memory area, reading the command written at the position in the first memory area indicated by a first read pointer that tracks the first write pointer;

if the read command is a real-time command, after executing the real-time command, moving the first read pointer to the next command position in the first memory area, and if the read command is a normal command, when writing the normal command to the second memory area, writing the normal command at a position in the second memory area indicated by a second write pointer and then moving the second write pointer to a position for writing a next normal command in the second memory area; and wherein a second read pointer that follows the second write pointer indicates a position at which the normal command to be read and executed is located in the second memory area, and after reading and executing the normal command, moving the second read pointer to the position of the next command in the second memory area.

8. The method of controlling a recording device described in claim 7, wherein, when available storage capacity in the second memory area is less than a specific amount, the method further comprises steps of:

sending to the control device a report that available storage capacity in the second memory area is less than the specific amount, and if a command is received from the control device after the report was sent, in writing the command to the first memory area, writing the command at a position in the first memory area indicated by a first write pointer and then moving the first write pointer to a position for writing a next command in the first memory area, and after executing the real-time command, moving a first read pointer to the position of the next command in the first memory area, and if the read command is a normal command, moving the first read pointer to the next command position without writing the normal command to the second memory area.

9. A storage medium storing a program for execution by a control unit that controls parts of a recording device capable of connecting to a control device and including a first memory area and a second memory area that is different from the first memory area, the program, when executed, causing the control unit to:

write a command, when received from the control device, to the first memory area, and read the command written to the first memory area;

if the read command is a real-time command, execute the real-time command with priority with respect to a normal command; and if the read command is a normal command, write the normal command to the second memory area for subsequent reading and execution from the second memory area.

10. The storage medium described in claim 9, wherein, when available storage capacity in the second memory area is less than a specific amount, the program further causes the control unit to:

send to the control device a notice that the available storage capacity in the second memory area is less than the specific amount, if a command is received from the control device after sending the notice, write the command to the first memory area and read the command written to the first memory area, and if the read command is a normal command, not write the normal command to the second memory area.

11. The storage medium described in claim 9, wherein the program further causes the control unit to:

when writing a command received from the control device to the first memory area, write to a position in the first memory area indicated by a first write pointer and then move the first write pointer to a position for writing a next command in the first memory area, when the command is received from the control device;

when reading the command written to the first memory area, read the command written at the position in the first memory area indicated by a first read pointer that tracks the first write pointer;
- if the read command is a real-time command, after executing the real-time command, move the first read pointer to the next command position in the first memory area, and
- if the read command is a normal command, when writing the normal command to the second memory area, write the normal command at a position in the second memory area indicated by a second write pointer and then move the second write pointer to a position for writing a next normal command in the second memory area; and wherein a second read pointer that follows the second write pointer indicates a position at which the normal command to be read and executed is located in the second memory area, and after reading and executing the normal command, move the second read pointer to the position of the next command in the second memory area.

12. The storage medium described in claim 11, wherein, when available storage capacity in the second memory area is less than a specific amount, the program further causes the control unit to:

- send to the control device a report that the available storage capacity in the second memory area is less than the specific amount, and
- if a command is received from the control device after the report was sent, in writing the command to the first memory area, write the command at a position in the first memory area indicated by a first write pointer and then move the first write pointer to a position for writing a next command in the first memory area, and
- after executing the real-time command, move a first read pointer to the position of the next command in the first memory area, and
- if the read command is a normal command, move the first read pointer to the next command position without writing the normal command to the second memory area.

* * * * *